United States Patent

Pforr et al.

[11] Patent Number: 4,769,227
[45] Date of Patent: Sep. 6, 1988

[54] PREPARATION OF ANHYDROUS ALUMINUM CHLORIDE

[75] Inventors: Gerhard Pforr, Ludwigshafen; Hermann Meyer, Mannheim; Wilhelm Goesele, Wachenheim; Hans Stark, Bobenheim-Roxheim, all of Fed. Rep. of Germany

[73] Assignee: BASF Aktiengesellschaft, Ludwigshafen, Fed. Rep. of Germany

[21] Appl. No.: 54,995

[22] Filed: May 28, 1987

[30] Foreign Application Priority Data

Jun. 13, 1986 [DE] Fed. Rep. of Germany ....... 3620023

[51] Int. Cl.⁴ .............................................. C01F 7/60
[52] U.S. Cl. .................................................. 423/496
[58] Field of Search ........................................ 423/496

[56] References Cited

U.S. PATENT DOCUMENTS

| | | | |
|---|---|---|---|
| 3,842,163 | 10/1974 | Russell et al. | 423/496 |
| 4,289,735 | 9/1981 | Mueller et al. | 423/496 |
| 4,301,138 | 11/1981 | Ryan et al. | 423/495 |
| 4,541,907 | 9/1985 | Culleiton et al. | 423/496 |
| 4,565,674 | 1/1986 | Rao et al. | 423/496 |

FOREIGN PATENT DOCUMENTS 0668620 3/1952 United Kingdom .
0850440 10/1960 United Kingdom .

OTHER PUBLICATIONS

Helv. Chimica Acte 15 (1932), pp. 1353–1362.
Helv. Chimica Acte 62 (1979), pp. 76–84.

*Primary Examiner*—Robert L. Stoll
*Assistant Examiner*—Adriana L. Mui
*Attorney, Agent, or Firm*—Keil & Weinkauf

[57] ABSTRACT

Anhydrous aluminum chloride is prepared by reacting γ-alumina with carbon monoxide and chlorine and/or phosgene in a fluidized bed at from 400° to 700° C. The γ-alumina used gives, with $CuK_\alpha$ radiation, an X-ray diffraction pattern whose intensity at the diffraction angle $2\Theta = 42.8° \pm 0.4°$ divided by the intensity at the diffraction angle $2\Theta = 45.7° \pm 0.2°$ is $\leq 0.38$.

4 Claims, 1 Drawing Sheet

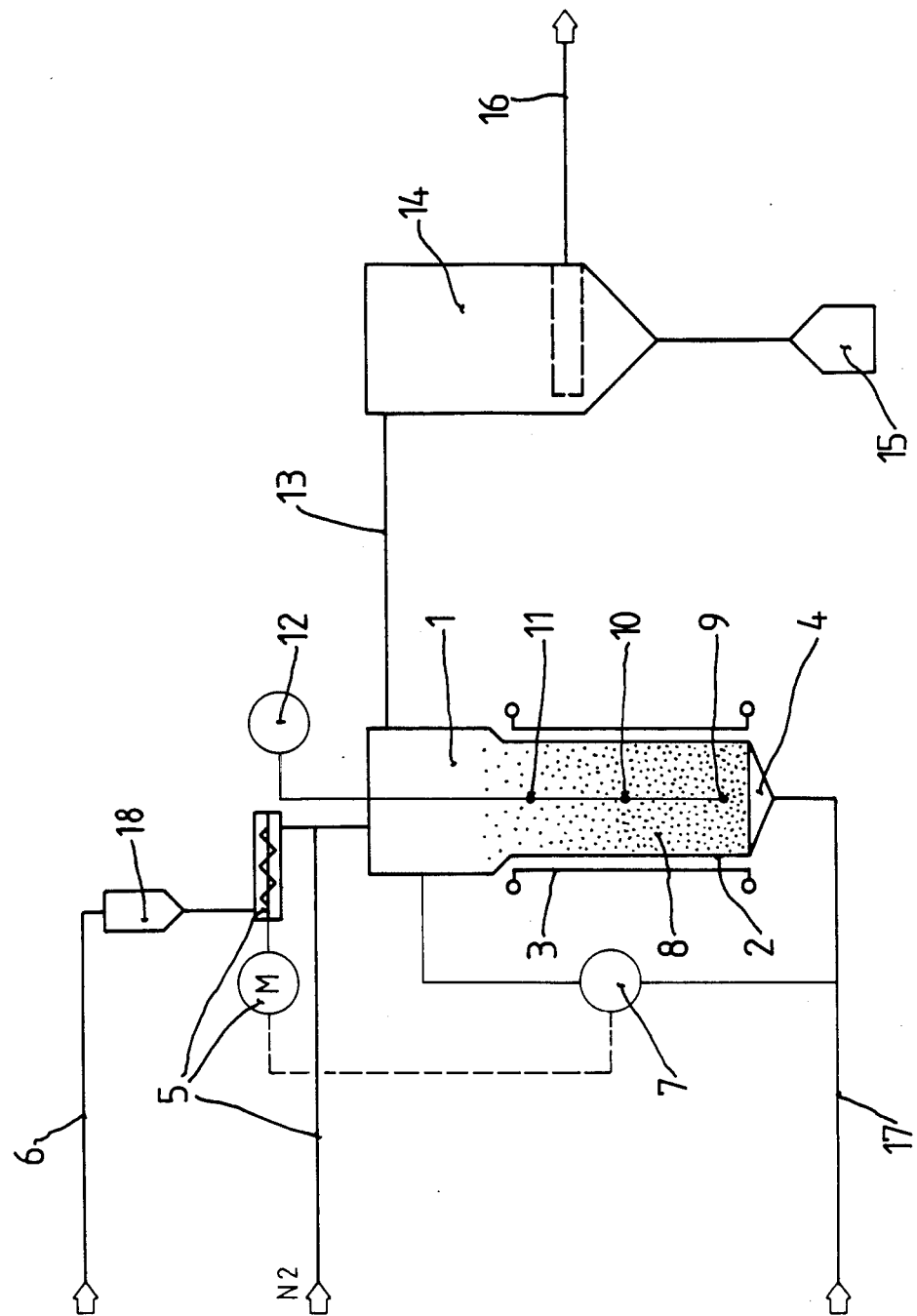

PREPARATION OF ANHYDROUS ALUMINUM CHLORIDE

The present invention relates to a process for the preparation of anhydrous aluminum chloride by reacting γ-alumina with carbon monoxide and chlorine and/or phosgene at from 400° to 700° C.

It is known that anhydrous alumina can be prepared by reacting γ-alumina with chlorine and carbon monoxide and/or phosgene in a fluidized bed (DE-C-1,061,757 and DE-C-817,457).

Helv. Chim. Acta. 15 (1932), 1353–1362 furthermore discloses that the reaction rate depends to a very great extent on the nature of the alumina used, and that the higher-energy γ-alumina reacts more rapidly than the lower-energy α-alumina, ie. the completely calcined corundum (α-Al$_2$O$_3$). According to Helv. Chim. Acta 62 (1979), 76–84, the alumina properties which are important for chlorination are 1) a large specific surface area, 2) a low residual water content and 3) high concentrations of defect structures (ie. high content of X-alumina) and high thermal stability.

In the known processes for the preparation of anhydrous aluminum chloride in a fluidized bed by reacting alumina with carbon monoxide and chlorine and/or phosgene, it is found that, as the operating time progresses, sluggishly reacting starting material accumulates in the reactor and this residue has an adverse effect on the conversion. To regenerate the reactor, this sluggishly reacting residue must be removed from the reactor; because the gases involved, carbon monoxide, chlorine and phosgene, constitute a danger to health, this operation is not without danger and is therefore very technically complicated to carry out. This regeneration of the reactor must also be carried out when the reactive substance γ-alumina is used as the starting material.

During the work which led to the present invention, it was observed that the commercial γ-aluminas having a content of ≦2% of α-Al$_2$O$_3$ exhibit very different chlorination behavior in a fluidized bed reactor, and that even under constant operating conditions different amounts of sluggishly reacting residues are formed, the main component of which proved to be α-Al$_2$O$_3$. We also found that very different space-time yields are obtained when γ-aluminas from different sources are used.

It is an object of the present invention to avoid these disadvantages in a process for the preparation of anhydrous aluminum chloride by reacting γ-alumina containing ≦2% by weight of α-alumina in a fluidized bed with carbon monoxide and chlorine and/or phosgene at from 400° to 700° C.

We have found that this object is achieved if the γ-alumina used gives, with CuK$_α$ radiation, an X-ray diffraction pattern whose intensity at the diffraction angle 2Θ=42.8°±0.4° divided by the intensity at the diffraction angle 2Θ=45.7°±0.2° is ≦0.38.

The present invention is based on the surprising discovery that the content of a certain alumina modification in the γ-alumina used, expressed by the quotient of the intensity at the diffraction angle 2Θ=42.8°±0.4° and the intensity at the diffraction angle 2Θ=45.7°±0.2°, must be very low and should have a value of ≦0.38, preferably ≦0.35.

According to the BRAGG equation, an interplanar spacing d of about 2.11–2.12 Å corresponds to the diffraction angle 2Θ=42.82°±0.4°, and an interplanar spacing d of about 1.98 Å corresponds to the diffraction angle 2Θ=45.7°±0.2°. According to ASTM index No. 4-0880 or 13-373, the presence of chi(χ) aluminas can be assumed if the intensity at the diffraction angle 2Θ=42.82°±0.4° in the diffraction pattern obtained with CuK$_α$ radiation is substantially higher than the background. The strong line in the CuK$_α$ diffraction pattern at the diffraction angle 2Θ=45.7°±0.2° (interplanar spacing d about 1.98 Å) with a pronounced maximum can be assigned with sufficient certainty to the modification γ-alumina, according to ASTM index No. 10-425 or 29-0063.

Accordingly, in the X-ray diffraction pattern obtained with CuK$_α$ radiation, the intensity at the diffraction angle 2Θ=42.8°±0.4° is very probably dependent on the content of χ-alumina, and the intensity at the diffraction angle 2Θ=45.7°±0.2° is dependent on the content of γ-alumina. The quotient of these intensities therefore indicates the presence of chi(χ) aluminas in γ-aluminas.

The Examples which follow illustrate the invention. The chlorination reactor used is shown in the FIGURE.

The reactor (1) consists of a quartz tube (2) of nominal diameter 120 mm, having an electric heater (3). The quartz tube (2) widens out to a nominal diameter of 200 mm above the electric heater. The height of the reactor is 2,260 mm. The reaction gas CO/Cl$_2$/COCl$_2$, containing about 20% of phosgene and prepared beforehand from 1.2 m$^3$ (S.T.P.)/h of a stoichiometric CO/Cl$_2$ gas mixture, is passed through line 17 into the bottom of the reactor (1), via a suitable gas distributor (4). A metering apparatus (5) flushed with nitrogen transports alumina continuously into the reactor (1) from the container (18), into which alumina is introduced via line (6). Regulation (7) of the differential pressure of the metering apparatus (5) ensures a constant amount of alumina in the fluidized bed (8) of the reactor (1) during the chlorination. A temperature control keeps the electric heater (3) constant at 550° C. The axial temperature in the fluidized bed (8) is recorded at the bottom (9), in the middle (10) and at the outlet (11), by means of measuring apparatus (12). Line (13) transports the reaction products and unconverted starting material to the condenser (14). In the condenser (14), the gaseous reaction product aluminum chloride desublimes. The solid product aluminum chloride collects in the container (15). The alumina dust present in the product is separated off subsequently. The reactor (1) reaches a production rate of up to 2.3 kg/h of aluminum chloride. All the chlorine-containing components of the waste gas taken off through line (16) are destroyed in a downstream waste gas treatment plant.

EXAMPLE 1 (Comparative Example)

γ-Alumina (α-Al$_2$O$_3$ content<1% by weight) was introduced into the empty reactor, and continuously replenished as it was consumed. The height of the unexpanded bed at the beginning of the experiment was about 900 mm. As the chlorination process progressed, the charge height for a constant charge decreased. The X-ray diffraction pattern of the γ-alumina used showed the following intensities:

diffraction angle 2Θ=42.8°±0.4°, intensity I=252 pulses diffraction angle 2Θ=45.7°±0.2°, intensity I=601 pulses.

This gave a quotient of 0.42.

Because of the formation of channels in the fluidized bed, the chlorination had to be terminated after 203 hours of operation. The fluidization state of the bed was homogeneous at the beginning of chlorination. With increasing operating time, the fluidized bed exhibited inhomogeneities, which were indicated by non-fluidized regions and an inhomogeneous temperature distribution and finally led to channel formation. The axial reactor temperature, for example after about 100 hours of operation, was about 600°–630° C. at the bottom of the fluidized bed and 700°–720° C. in the middle and at the outlet of the fluidized bed, despite a constant heating temperature of 550° C. The yield based on chlorine reached 80–83% at the beginning of chlorination. Shortly before the reactor was shut down, the yield based on chlorine had fallen to about 50%. This yield is calculated from the amount of chlorine bonded in the product and the amount of chlorine fed to the reactor per unit time.

After the termination of the chlorination, the alumina present in the reactor was analyzed. The analysis showed that the reactor contained more than 50% by weight of α-alumina.

EXAMPLE 2

γ-Alumina (α-$Al_2O_3$ content <1% by weight) from a different production batch was introduced into the empty reactor and replenished continuously as it was consumed. The height of the unexpanded fluidizable bed in the reactor during the entire chlorination experiment was constant at about 900 mm. The X-ray diffraction pattern of the γ-alumina used showed the following intensities:

diffraction angle $2\Theta = 42.8° \pm 0.4°$, intensity I=219 pulses diffraction angle $2\Theta = 45.7° \pm 0.2°$, intensity I=668 pulses This gave a quotient of 0.33.

The reactor could be operated with this γ-alumina without inhomogeneities occurring in the fluidized bed of the reacting alumina. Even after 292 hours of operation, the axial temperature distribution of the reactor was homogeneous, the temperature at the beginning of the chlorination being from 580° to 600° C. at the bottom, in the middle and at the outlet of the fluidized bed, with a constant heating temperature of 550° C. The average yield based on chlorine was constant at about 88%.

The alumina present in the reactor was analyzed after 292 hours of operation. The analysis showed that the reactor contained less than 10% of α-alumina.

We claim:

1. A process for the preparation of anhydrous aluminum chloride by reacting γ-alumina containing ≦2% by weight of α-alumina in a fluidized bed with carbon monoxide and chlorine, phosgene or mixture thereof at from 400° to 700° C., wherein the γ-alumina used gives, with $CuK_\alpha$ radiation, an X-ray diffraction pattern whose intensity at the diffraction angle $2\Theta = 42.8° \pm 0.4°$ divided by the intensity at the diffraction angle $2\Theta = 45.7° \pm 0.2°$ is ≦0.38.

2. The process of claim 1 in which the γ-alumina is reacted with carbon dioxide and chlorine.

3. The process of claim 1 in which the γ-alumina is reacted with phosgene.

4. The process of claim 1 in which the γ-alumina is reacted with a mixture of carbon monoxide, chlorine and phosgene.

* * * * *